United States Patent [19]
Canonaco

[11] 3,807,546
[45] Apr. 30, 1974

[54] APPARATUS FOR CONVEYING HEAT TREATED FLAT OR SHAPED GLASS SHEETS
[75] Inventor: Rudy Canonaco, Cheswick, Pa.
[73] Assignee: PPG Industries, Inc., Pittsburgh, Pa.
[22] Filed: Sept. 5, 1972
[21] Appl. No.: 285,999

[52] U.S. Cl. .............................. 198/127 R, 193/37
[51] Int. Cl. ............................................ B65g 13/02
[58] Field of Search ........ 198/127; 193/37; 65/245, 65/253, 374; 29/110, 116 R, 125

[56] References Cited
UNITED STATES PATENTS
| | | | |
|---|---|---|---|
| 2,232,765 | 2/1941 | Blvin | 29/125 |
| 2,889,696 | 6/1959 | Lunch | 29/116 R |
| 2,300,528 | 11/1942 | Sherts | 65/253 |
| 3,642,274 | 2/1972 | Herrington et al. | 29/116 R |
| 3,371,409 | 3/1968 | Bonnet et al. | 65/374 X |

Primary Examiner—Evon C. Blunk
Assistant Examiner—Douglas D. Watts
Attorney, Agent, or Firm—Edward I. Mates

[57] ABSTRACT

Apparatus for conveying hot glass sheets in a non-vertical orientation through a cooling station on spaced rolls capable of adjustment to support and convey either flat or shaped glass sheets. Separate cover means that is harmless to glass is provided for covering adjustable elements around the periphery of each roll without closing the roll or the space between adjacent rolls so that said spaces are left open to permit free flow of cooling fluid against the supported surface of the conveyed hot glass sheets.

10 Claims, 5 Drawing Figures

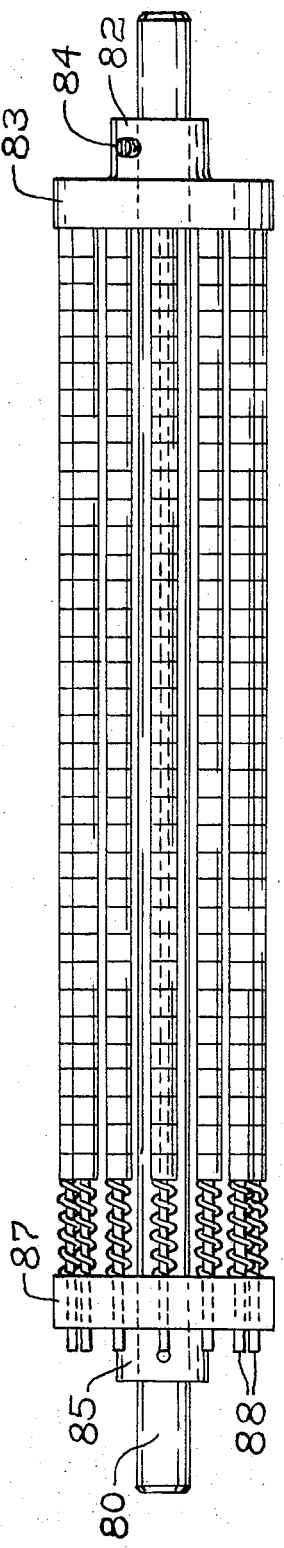
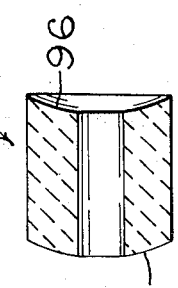
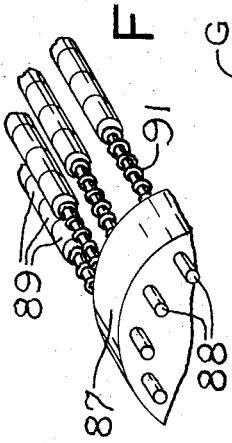
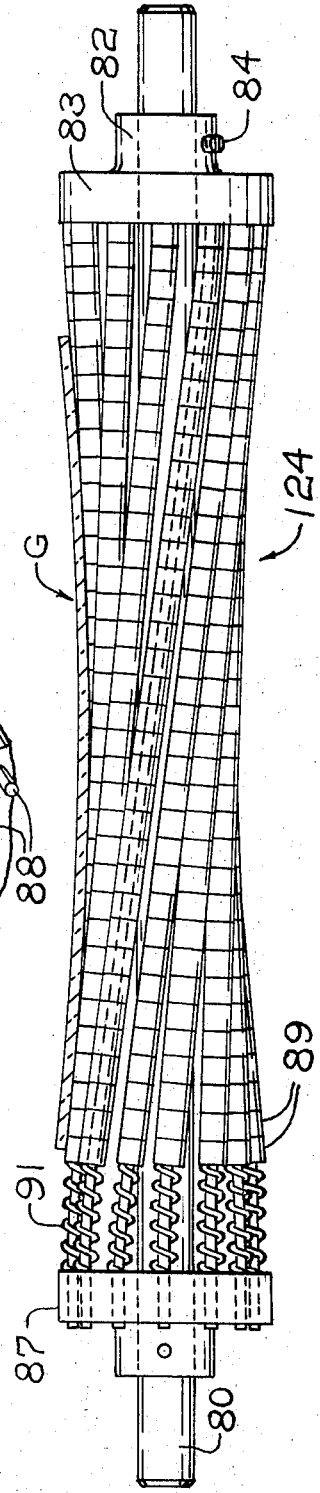

APPARATUS FOR CONVEYING HEAT TREATED FLAT OR SHAPED GLASS SHEETS

BACKGROUND OF THE INVENTION

1. Field of the Invention

The present invention relates to apparatus for conveying hot glass sheets in a non-vertical orientation and particularly relates to apparatus for conveying hot, shaped glass sheets through a cooling station. The apparatus of the present invention is of the conveyor roll type. When glass sheets are bent and then cooled for tempering or heat-strengthening, the glass is first heated to its deformation temperature so that it can be shaped to the desired curvature. However, when glass is sufficiently hot to be shaped or heat-strengthened, its surfaces are very susceptible to becoming marked and/or distorted, especially when the hot glass is conveyed along a series of rolls having sufficient rigidity at elevated temperatures needed for glass tempering to support the glass sheets as they are conveyed through regions of different temperatures.

It has been suggested to selectively chill the surface only of the hot glass to avoid surface marking caused by direct roll to hot glass contact. However, any premature chilling of the glass surface reduces the overall glass temperature and reduces the maximum compression stress that can be obtained by subsequent chilling. Furthermore, any chilling that is uneven from surface to surface may cause warpage of the sheet and uniform cooling that avoids warpage is difficult to obtain.

It has also been proposed to shape the glass like a dome and support the glass along its longitudinal side edges only from the shaping station to the cooling station in order to reduce glass to roll contact. If the shaped glass is deposited directly on the conveyor rolls, the utility of such a suggestion is limited to certain shapes of glass having straight side edges only.

Carriages with movable glass supporting fingers have been used to transfer glass sheets from a shaping station for redeposition on the conveyor rolls at a cooling station. Such finger support may sometimes provide too small an area for supporting the entire glass mass and thus may cause local variations from desired shape that results in optical distortion when the glass is too heavy to be supported on spaced fingers defining narrow areas of support.

Flat glass sheets have been supported on solid conveyor rolls provided with covers of a material that does not harm glass on rolling contact therewith. However, prior to the present invention, covered rolls provided with the capability of adjustment to curved shapes were not provided with sufficient structural rigidity about their periphery to avoid a whipping or vibratory action when the glass conveying rolls rotated at high speeds. Such action causes the roll peripheral surface to deviate from the adjusted curved shape at which the roll is intended to rotate.

2. The Prior Art

U.S. Pat. No. 3,301,383 to Doyer discloses a conveyor belt supported on a series of rolls comprising a central shaft and a plurality of straight rods all of which cross the roller shaft at the same angle and at the same distance. The rods are made of plastic, so the rolls are unsuitable for contacting hot glass at the glass deformation temperature. In addition, the Doyer rolls support a continuous belt for conveying work pieces. Such a conveyor would not be suitable for conveying glass sheets between a pair of opposed plenum chambers having opposed nozzle openings through which chilling medium such as air is blasted to temper heat-softened glass. The Doyer belt would interfere with the free flow of chilling medium toward the under surface of conveyed glass sheets.

Other patents showing rolls having adjustable work contacting shapes are U.S. Pat. No. 763,251 to Breck; 2,771,658 to Morrill, 2,898,662 to Robertson; 2,960,749 to Robertson et al.; 2,996,784 to Young; 3,012,301 to Rogers et al.; 3,088,580 to Hughes; 3,094,771 to Robertson; 3,157,935 to Birch; 3,220,538 to Kelley; 3,328,866 to Robertson and 3,500,524 to Jagminas. These latter patents show various constructions that differ considerably from the construction of the present invention and none of these patents relate to rolls for use in conveying shaped glass sheets through a tempering station.

Other patents on conveyor rolls that change shape to accommodate for glass sheet shapes are U.S. Pat. No. 3,485,615 to Rahrig et al. and 3,485,618 to Ritter. While these last two named patents show conveyor rolls adapted to convey hot glass, their principle of operation is entirely different from that of the present invention in that they lack a rigid central driving shaft or a series of peripheral shafts that retain their shape during a driving operation. Hence, the conveyor rolls of these patents do not prevent a whipping or vibratory action when the rolls are rotated at elevated speeds needed for high speed mass processing of bent and tempered glass sheets.

SUMMARY OF THE INVENTION

The present invention relates to a roll type conveyor, especially suitable for conveying hot glass sheets through a glass chilling station. The rolls have a rigid center shaft, a pair of hubs, additional peripheral shafts interconnecting the peripheral portions of said hubs, and means for adjusting the angular position of at least one of said hubs with respect to the other hub so that the peripheral shafts extend at an angle to the rigid center shaft from hub to hub, thus defining a series of lines that intersect a curvilinear plane conforming to the shape of conveyed bent glass sheets and provide lines of support that move obliquely of the path of glass movement. Each peripheral shaft is individually covered with a series of nesting beads composed of a material that does not mar hot glass, such as an alumina-silica refractory. The space between adjacent conveyor rolls and between adjacent peripheral shafts within each roll is left open to allow free flow of tempering medium.

BRIEF DESCRIPTION OF THE DRAWINGS

In the drawings which form part of a description of a preferred embodiment of the present invention and wherein like reference numbers refer to like structural elements.

FIG. 2 is a fragmentary transverse view of a conveyor roll according to the present invention adjusted to convey flat glass, with certain parts omitted to show other parts clearly, FIG. 3 is a view similar to FIG. 2, showing the roll of FIG. 2 adjusted to support and convey curved glass sheets, FIG. 4 is an enlarged, fragmentary, perspective view of a portion of the roll adjusted as in FIG. 2, and FIG. 5 is an enlarged cross-sectional view of a ceramic bead incorporated as an element of the present invention.

DESCRIPTION OF A PREFERRED EMBODIMENT OF THE INVENTION

Figure 1:
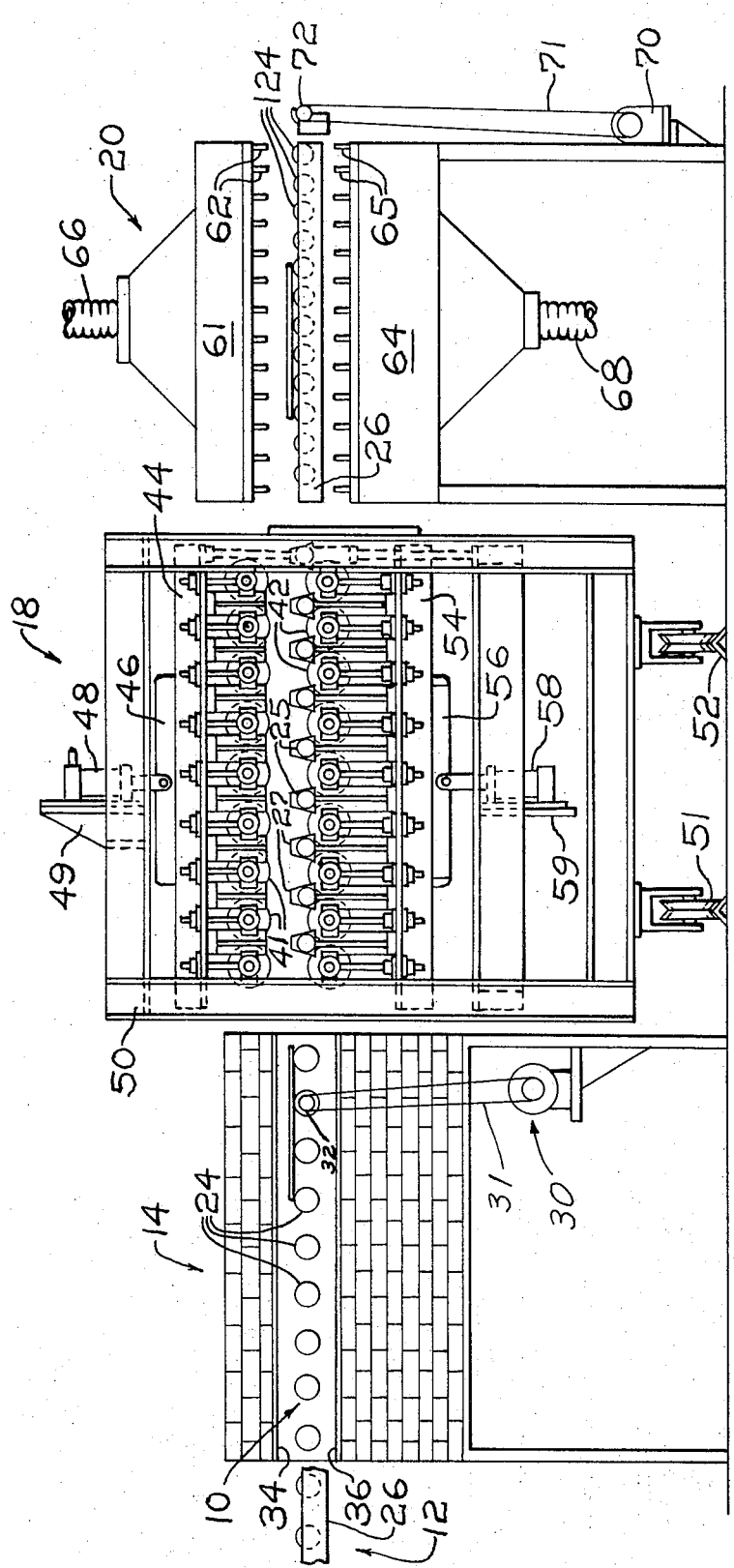
FIG. 1 is a longitudinal assembly view of a glass sheet bending and tempering apparatus suitable for incorporating rolls according to the present invention at the glass sheet cooling station.

A preferred embodiment of apparatus suitable for using the present invention comprises a horizontal conveyor 10 extending through a loading station 12, a tunnel type furnace 14, a bending station 18, a chilling station 20, one or more cooling stations as needed (not shown) and an unloading station (not shown) beyond the chilling station. The horizontal conveyor 10 comprises a series of transversely extending, longitudinal spaced rolls 24, 25 and 124. Rolls 24 and 124 are supported at their opposite ends on bearing housings carried by longitudinally extending supports 26 (mostly broken away) mounted on vertical pillars (not shown), while conveyor rolls 25 are mounted on spaced bearing brackets 27 at the bending station 18.

The conveyor portion from the loading station 12 through the cooling station 20 is run continuously at an established conveyor speed from a drive motor 30 which is connected through a driving chain 31 to a drive sprocket 32 and chain drives (not shown) to sprockets fixed to one of the conveyor rolls 24 and interconnected by one or more drive chains to other drive sprockets fixed to each conveyor roll in the usual manner. The rolls 24, 25 and 124 are disposed either horizontally or at a slight oblique angle transverse to the path of movement to define a support plane along which a series of glass sheets is conveyed in a predetermined conveyor path extending through the loading station 12, the furnace 14, the bending station 18, the chilling station 20, the cooling stations (if included) and the unloading station.

Furnace 14 has the usual heating elements 34 and 36 disposed above and below the path taken by glass sheets as the conveyor rolls 24 are rotated in unison to engage and propel the glass sheets forward by friction in the usual manner. Thus, the glass sheets are heated to a temperature of from 1,200°F. to 1,300°F. while conveyed through the furnace.

Intermediate vertical planes occupied by each of the adjacent conveyor rolls 25 of the portion of the conveyor path extending through the bending station 18 is a pair of sets of shaped rolls 41 and 42 of complementary contour. Each upper shaped roll 41 is aligned with a corresponding lower shaped roll 42. The upper rolls are rotatably supported from their ends by vertically adjustable trunnions in an open frame structure 44 depending from an upper platform 46 which is attached to the lower end of a rod of an upper piston 48 carried on the upper portion 49 of a movable frame mechanism 50. The latter is provided with wheels 51 that ride on tracks 52 to facilitate sideways displacement of the frame mechanism 50. Similarly, the lower rolls 42 are rotatably supported on vertically adjustable trunnions in a lower open frame 54 connected to and supported by a lower platform 56. The lower platform is attached to the upper end of a rod of a lower piston 58. A lower portion 59 of frame mechanism 50 carries the lower piston 58. Means is provided for rotating rolls 41 and 42 at approximately the same peripheral speed as rolls 25 so that rubbing between a surface of the glass sheet and the shaped rolls is minimized when a glass sheet moves over the conveyor rolls 25 at the bending station 18. When the glass sheet is aligned between the shaped rolls 41 and 42 the lower set of shaped rolls 42 move upward to lift the heat-softened glass off the conveyor rolls 24 and into rolling pressurized contact against the upper set of shaped rolls 41 for a brief interval sufficient to impose the curvature of the rolls onto the heat-softened glass sheet before the lower rolls 42 retract to redeposit the shaped glass sheet on the conveyor rolls 25. The details of the roll pressing apparatus do not form part of the present invention but is the subject matter of U.S. Pat. application Ser. No. 195,152 of Robert G. Frank, filed Nov. 3, 1971, the disclosure of which is incorporated herein by reference.

The chilling station 20 comprises an upper plenum chamber 61 having downwardly extending nozzles 62 whose exit openings are disposed above special conveyor rolls 124 that extend horizontally in a transverse direction in longitudinally spaced relation throughout the chilling station 20 and a lower plenum chamber 64 having upwardly facing nozzles 65 extending upward toward the spaces between the conveyor rolls 124 of the chilling station 20. Means is provided for delivering air under pressure through delivery passages 66 and 68 to the respective plenum chambers 61 and 64 so that cool air blasts may be imparted to the upper and lower surfaces of glass sheets that are conveyed through the chilling station 20. A drive motor 70, drive chain 71 and sprocket 72 may be provided to impart rotation to selected sections of the conveyor rolls 24, 25 and/or 124 through additional chain drives and clutches (not shown) at different speeds if desired in a manner well known in the conveyor art.

The gist of the present invention is in providing special conveyor rolls 124 at the chilling station 20. The special conveyor rolls are capable of adjusting the shape of their peripheral portion to provide glass supporting elements that extend either parallel to a central shaft that drives the rolls for conveying flat glass sheets or are angled relative to said central shaft to enable the rolls to support and convey curved glass sheets. The glass supporting elements are peripherally arranged and made of flexible metal rods that provide structural rigidity to support the conveyed glass sheets, but that would tend to damage the surface of heat-softened glass sheets. Hence, each rod is provided with glass engaging means of a material that does not harm glass and that protects the moving glass sheets from making direct contact with the peripherally arranged glass supporting elements. The space between adjacent conveyor rolls 124 is open to allow free air movement so that hot glass sheets conveyed by the rolls between upper plenum 61 and lower plenum 64 can be chilled rapidly and thus tempered. Also, the means covering each individual peripheral rod is flexible to conform to any twist that may be imparted to the rod on which it is mounted for reasons explained later.

Specifically, according to the present invention, the conveyor rolls to be used in the chilling station 20 are capable of adjustment between a peripheral surface capable to support and convey either flat or curved glass sheets while providing a minimum interference with the free flow of tempering medium such as air blasts which are conventionally used in a chilling station to rapidly chill the glass sheet surface so as to impart a temper to the glass.

Each of the special rolls 124 according to the present invention is provided with a centrally disposed shaft 80 having a locking collar 82 provided with an enlarged inner end portion forming a hub 83 for receiving the right hand end of a dozen rods 88 of flexible steel approximately .10 inch in diameter. A set screw 84 fixes the locking collar 82 together with the enlarged hub 83 both axially and rotatably with respect to the centrally disposed shaft 80. A support collar 85 containing an enlarged peripherally apertured hub 87 has the left end of each flexible rod 88 extending through one of its apertures. A number of beads 89 of smooth ceramic material, such as an alumina-silica refractory or the like, are rotatably supported in axial alignment along the length of each of the flexible steel rods 88 between the collar 87 and the extreme left bead 89. The beads 89 are nested to one another along the length of the rods 88 and the springs 91 are sufficiently strong to insure that the beads 89 abut one another so as to provide a continuous or substantially continuous surface along the length of each of the rods 88 along which the beads are mounted.

In FIG. 2, the rods 88 are connected between each of the peripheral openings in the enlarged hub 83 at the inner end portion of the locking collar 82 and the corresponding openings of the enlarged apertured hub 87 so that each flexible rod 88 extends parallel to the centrally disposed shaft 80 so that the periphery of the beads 89 provide rounded surfaces for supporting a moving flat glass sheet. Furthermore, the beads are of such a diameter that space is provided between adjacent lines of beads mounted on adjacent flexible peripheral rods 88. Therefore, when air is blasted against the opposite surfaces of glass sheets conveyed through the cooling station 20 through nozzle openings 62 and 65 between adjacent rolls 124, the space within each roll 124 provides a good path for the escape of air from the lower glass surface that has been impinged with air.

When it is necessary to convert the conveyor rolls 124 to a curved peripheral shape such as depicted in FIG. 3, all that is necessary is to unlock set screw 84 and rotate the locking collar 82 to any angle desired with respect to the position of the apertured hub 87 while maintaining the flexible steel rods 88 in position until an outline capable of supporting a curved glass sheet G in the manner depicted in FIG. 3 is obtained. The set screw 84 fixes the position of the locking collar 82 together with its apertured enlarged hub 83 at its inner end portion with respect to the centrally disposed shaft 80 so that the conveyor roll 124 is now in condition to support a curved glass sheet and space still remains between adjacent lines of beads 89 for the exhaust of air blasts as well as the space normally provided between adjacent conveyor rolls 124.

In order to assure that the flexible rods 88 remain interconnected between the enlarged hub 83 and the peripherally apertured hub 87, the length of the flexible rods 88 is made slightly longer than the distance between hubs 83 and 87 so as to provide means for compensating for the shortening of the component parallel to the length of the centrally disposed shaft 80 when the rods 88 are twisted relative to the center shaft.

FIG. 5 shows a detail whereby individual beads 89 can be arranged in nesting relation to one another so that the aligned beads follow any twist imparted to the flexible peripheral rods 88 when the rolls 124 are adjusted to support curved glass sheets. Each bead has a spherical convex end surface 95 at one end and a spherical concave end surface 96 at the other end. The concave end surface 96 of one bead nests against the convex end surface of an adjacent bead. The beads are small enough to follow any shape imparted to the flexible peripheral rods 88. In other words, the convex and concave spherical surfaces of adjacent beads form sockets.

In a preferred embodiment of the present invention, conveyor rolls for use in processing glass sheets up to 18 inches in their smallest dimension comprise a center shaft of 5/8 inch diameter provided with hubs having a three inch diameter spaced approximately 19 inches along the length of the shaft from one another. The peripherally arranged flexible rods are approximately 0.10 inch in diameter and are mounted with their ends disposed 30° from one another around the periphery of the opposing hubs. The beads have an outside diameter of 1/4 inch and a height of 1/4 inch with the convex surface protuding approximately 1/32 inch and the opposing concave surface recessed 1/32 inch to provide a rotatable fit or socket joint between adjacent beads so that they may be nested against one another. Each spring mounted to the left of the set of nested beads along each peripheral rod has a free length of one inch and an outer diameter of 1/4 inch and a pitch of 1/10 inch (10 turns to the inch). The spring is composed of spring wire having a diameter of 0.025 inch. The center shafts are 6 inches center to center.

While the rolls have been shown for use in a chilling station forming part of a roll press apparatus, it is understood that the rolls are also suitable for use in any kind of tempering apparatus and are suitable for use in conjunction with any type of shaping station, such as a press bending station where the glass is stopped and engaged by complementary shaping members at a shaping station before being returned to a conveyor or by vacuum shaping wherein vacuum is used in part or entirely to help shape the glass. The special cooling station rolls of the present invention may also be used with any type of conveyor for the furnace and/or shaping station such as a gas hearth rather then the roll conveyor depicted.

The form of the invention shown and described in this disclosure represents an illustrative preferred embodiment thereof. It is understood that various changes may be made without departing from the spirit of the invention as defined in the claimed subject matter that follows.

What is claimed is:

1. A conveyor roll for use in transporting glass sheets between spaced, opposed plenum chambers comprising a centrally disposed driving shaft, a pair of axially spaced hubs mounted on said driving shaft, a plurality of flexible peripheral shafts interconnecting peripheral portions of said hubs, each peripheral shaft having sufficient structural rigidity to support a moving glass sheet without appreciable distortion, a plurality of ceramic beads harmless to glass mounted in axially aligned relation along the length of each of said flexible peripheral shafts and of sufficiently small dimension to provide space for delivering tempering medium between said beads carried by adjacent peripheral shafts and between said beads and said centrally disposed shaft, said beads extending along sufficient portion of the length of each peripheral shaft to prevent direct contact of said peripheral shafts with the surface of a glass sheet conveyed on said roll, means to hold said beads in abutting slidable end to end relation along each of said peripheral shafts and means for supporting one of said hubs relative to the other of said hubs in angularly offset relation so that each of said flexible peripheral shafts extends between said hubs in nonparallel relation to said centrally disposed shaft and said beads provide lines of support for a convexly curved undersurface of a shaped glass sheet.

2. A roll as in claim 1, wherein each of said beads has a convex end surface and a concave end surface and said beads are arranged in nesting relation with a convex end surface of one bead nesting against the concave end surface of an adjacent bead.

3. A roll as in claim 1, wherein said beads are composed of an alumino-silica refractory.

4. A conveyor roll for use in transporting glass sheets between spaced, opposed plenum chambers comprising a centrally disposed driving shaft, a pair of axially spaced hubs mounted on said driving shaft, a plurality of flexible peripheral shafts interconnecting peripheral portions of said hubs, each peripheral shaft having sufficient structural rigidity to support a moving glass sheet without appreciable distortion, a plurality of ceramic beads harmless to glass mounted in axially aligned relation along the length of each of said flexible peripheral shafts and of sufficiently small dimension to provide space for delivering tempering medium between said beads carried by adjacent peripheral shafts and between said beads and said centrally disposed shaft, said beads extending along sufficient portion of the length of each peripheral shaft to prevent direct contact of said peripheral shafts with the surface of a glass sheet conveyed on said roll, means to hold said beads in abutting slidable end to end relation along each of said peripheral shafts, each of said beads having a convex end surface and a concave end surface, said beads being arranged in nesting relation with a convex end surface of one bead nesting against the concave end surface of an adjacent bead.

5. Apparatus for conveying flat or curved glass sheets for tempering comprising a plurality of longitudinally spaced conveyor rolls as in claim 4.

6. Apparatus for conveying flat or curved glass sheets for tempering comprising a plurality of longitudinally spaced conveyor rolls as in claim 1 spaced hubs mounted on said driving shaft and a plurality of flexible peripheral shafts interconnecting peripheral portions of said hubs, each shaft having sufficient rigidity to support a moving glass sheet thereon without appreciable distortion, the improvement comprising means harmless to glass rotatably carried by each of said flexible peripheral shafts and of sufficiently small dimension to provide space for delivering between said means carried by adjacent peripheral shafts and between said means and said centrally disposed shaft, said means harmless to glass extending along sufficient portion of the length of said shafts to prevent direct contact of said shafts with a surface of said glass sheets conveyed thereby.

7. A roll as in claim 1, wherein each of said beads has a convex end surface and a concave end surface and said beads are arranged in nesting relation with a convex end surface of one bead nesting against the concave end surface of an adjacent bead.

8. In apparatus as in claim 7, wherein said beads are composed of an alumino-silica refractory.

9. A roll as in claim 1, wherein one end of each of said peripheral shafts is fixed to one of said hubs and slidably received in a peripheral aperture of the other of said hubs and each of said peripheral shafts is sufficiently longer than the axial distance between said hubs to maintain its slidably received portion in one hub when at least one of said hubs is rotated to an angularly offset relation with respect to said other hub.

10. A roll as in claim 1, wherein said flexible peripheral shafts are fixed to one of said hubs at corresponding ends thereof in equiangular relation about the periphery of said one of said hubs and are slidably received at their other ends in equiangular relation about the periphery of the other of said hubs.

* * * * *

UNITED STATES PATENT OFFICE
CERTIFICATE OF CORRECTION

Patent No. 3,807,546          Dated  April 30, 1974

Inventor(s) Rudy Canonaco

It is certified that error appears in the above-identified patent and that said Letters Patent are hereby corrected as shown below:

Column 8, Claim 6, lines 7 to 22, please cancel all after "claim 1".

Column 8, Claim 7, line 1, "A roll as in claim 1" should read --In apparatus as in claim 6--.

Signed and sealed this 10th day of September 1974.

(SEAL)
Attest:

McCOY M. GIBSON, JR.
Attesting Officer

C. MARSHALL DANN
Commissioner of Patents